United States Patent
Oozawa et al.

(10) Patent No.: US 7,956,734 B2
(45) Date of Patent: Jun. 7, 2011

(54) WIRELESS TAG READER/WRITER APPARATUS

(75) Inventors: Shuji Oozawa, Shizuoka (JP); Yukihiko Kambe, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 293 days.

(21) Appl. No.: 12/205,306

(22) Filed: Sep. 5, 2008

(65) Prior Publication Data
US 2009/0058619 A1   Mar. 5, 2009

(30) Foreign Application Priority Data

Sep. 5, 2007 (JP) ................................ 2007-230168

(51) Int. Cl.
G08B 26/00 (2006.01)
G08B 13/14 (2006.01)
G05B 19/00 (2006.01)
(52) U.S. Cl. ................... 340/505; 340/572.1; 340/3.52; 340/5.92; 340/10.1; 340/10.32; 235/385; 705/22; 705/28
(58) Field of Classification Search ............... 340/505
See application file for complete search history.

(56) References Cited

U.S. PATENT DOCUMENTS

2007/0152047 A1 * 7/2007 Tu et al. ................. 235/385
2007/0276985 A1 * 11/2007 Schuessler ............... 711/100

FOREIGN PATENT DOCUMENTS

JP   2006-185391   7/2006
JP   2007-033259   2/2007

* cited by examiner

*Primary Examiner* — Donnie L Crosland
(74) *Attorney, Agent, or Firm* — Patterson & Sheridan, LLP

(57) ABSTRACT

A wireless tag reader/writer apparatus includes a receiving/transmitting antenna configured to transmit an interrogation signal to wireless tags, each having a storage unit with at least a reserved area and an EPC area for storing a group ID unique to the wireless tag, and configured to receive response signals from the wireless tags; a tag-data storing unit configured to store interrogation data and response data, the interrogation data being contained in the interrogation signal to be transmitted to the wireless tags, and the response data being contained in the response signals transmitted from the wireless tags; and a main control unit configured to detect the group ID stored in the reserve area of each wireless tag, from the response data stored in the tag-data storing unit, and configured to determine that at least one of the wireless tags has dropped out, from the number of group IDs stored in the reserved area of each wireless tag.

20 Claims, 9 Drawing Sheets

WIRELESS TAG READER/WRITER APPARATUS

CROSS-REFERENCE TO RELATED APPLICATION

This application is based upon and claims the benefit of priority from the Japanese Patent Application No. 2007-230168, filed on Sep. 5, 2007, the entire contents of which are incorporated herein by reference.

BACKGROUND OF THE INVENTION

1. Field of the Invention

The present invention relates to a wireless tag reader/writer apparatus. Particularly, the invention relates to a wireless tag reader/writer apparatus which can receive data from, and transmit data to wireless tags from a batch of articles a method of detecting dropping-out of wireless tags, and a wireless tag.

2. Description of the Related Art

Wireless tags (RFID: Radio Frequency Identification) according to this invention are chip-shaped responders, each having at least a memory and an antenna and being able to communicate (receive and transmit data) with a wireless tag reader/writer apparatus (hereinafter called "reader/writer apparatus") via the antenna connected to an interrogator.

In recent years, wireless tag systems have been used in rapidly increasing numbers, in which wireless tags are attached to articles and a reader/writer apparatus reads data from the wireless tags.

If a wireless tag is attached to, for example, a bundle of envelopes and stores data representing the number of envelopes, how many envelops constitute the bundle can be readily known by reading the data from the wireless tag, without necessity of counting the envelopes. This is desirable in view of the work efficiency. However, the reader/writer apparatus may fail to read the data from the wireless tag, depending on the condition of the wireless tag. In this case, the envelopes must be counted in order to determine whether all data has been read from the wireless tag. This not only requires the use of a counter, but also reduces the working efficiency.

To solve this problem, Jpn. Pat. Appln. Laid-Open Publication No. 2006-185391 discloses a reader/writer system. In this system, not only the ID data of an RF tag, but also the related data about the RF tags preceding and following the RF tag is recorded in the RF tag. From the related data, it is determined whether any envelope attached with an RF tag has slipped from the bundle.

Jpn. Pat. Appln. Laid-Open Publication No. 2007-33259 discloses a wireless tag data reading apparatus. This apparatus stores the data items read from two adjacent wireless tags, and reliably determines that any wireless tag has been moved from the article or has failed to work.

In the technique disclosed in Jpn. Pat. Appln. Laid-Open Publication No. 2006-185391, however, the data of only one or two tags, each preceding or following the tag attached to an article, is stored as related data. Hence, when two or more articles, such as envelopes, dropout, or the wireless tags drop from these articles, this fact cannot be detected.

The technique disclosed in Jpn. Pat. Appln. Laid-Open Publication No. 2007-33259 detects the order in which articles are arranged, each having a wireless tag attached to it, or detects the dropping-out of any article from the others. The articles of one batch must be arranged in exactly the same order as before. This inevitably decreases the efficiency of inspecting the articles.

BRIEF SUMMARY OF THE INVENTION

This invention has been made in consideration of such conventional wireless tag inspection apparatuses as described above, which detect the removal of articles, each having a wireless tag attached to it. An object of the invention is to provide a wireless tag reader/writer apparatus which can efficiently detect dropping-out of articles with wireless tags attached thereto, a method of detecting the dropping-out of wireless tags, and a wireless tag.

According to a first aspect of this invention, there is provided a wireless tag reader/writer apparatus that includes: a receiving/transmitting antenna configured to transmit an interrogation signal to wireless tags, each having a storage unit with at least a reserved area and an EPC area for storing a group ID unique to the wireless tag, and configured to receive response signals from the wireless tags; a tag-data storing unit configured to store interrogation data and response data, the interrogation data being contained in the interrogation signal to be transmitted to the wireless tags, and the response data being contained in the response signals transmitted from the wireless tags; and a main control unit configured to detect the group ID stored in the reserved area of each wireless tag, from the response data stored in the tag-data storing unit, and configured to determine that at least one of the wireless tags has dropped out, from the number of group IDs stored in the reserved area of each wireless tag.

According to the other aspects of the invention, there are provided a wireless tag reader/writer apparatus that can efficiently detect the removal of even two or more articles, each having a wireless tag attached to it, a method of detecting the removal of articles, and a wireless tag.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE INVENTION

Embodiments of the present invention will be described with reference to the accompanying drawings.

Generally, a wireless tag is assigned with an ID unique to it. The ID identifies the wireless tag. The ID is stored in the EPC area (later described) that the wireless tag has.

In the first embodiment of this invention, which will be described first, a provisional ID, which is different from the unique IDs, is assigned to the wireless tags of a batch, each tag identified by a unique ID. The provisional ID assigned to the articles of a batch may be a code or number that differs from any one of the unique IDs.

In the second embodiment of the invention that will be described later, only unique IDs are used. Since the unique IDs are unique to the wireless tags, respectively, they are of course different from one another. In the present invention, the IDs of both types will be generally called "group IDs."

First Embodiment

Figure 1:
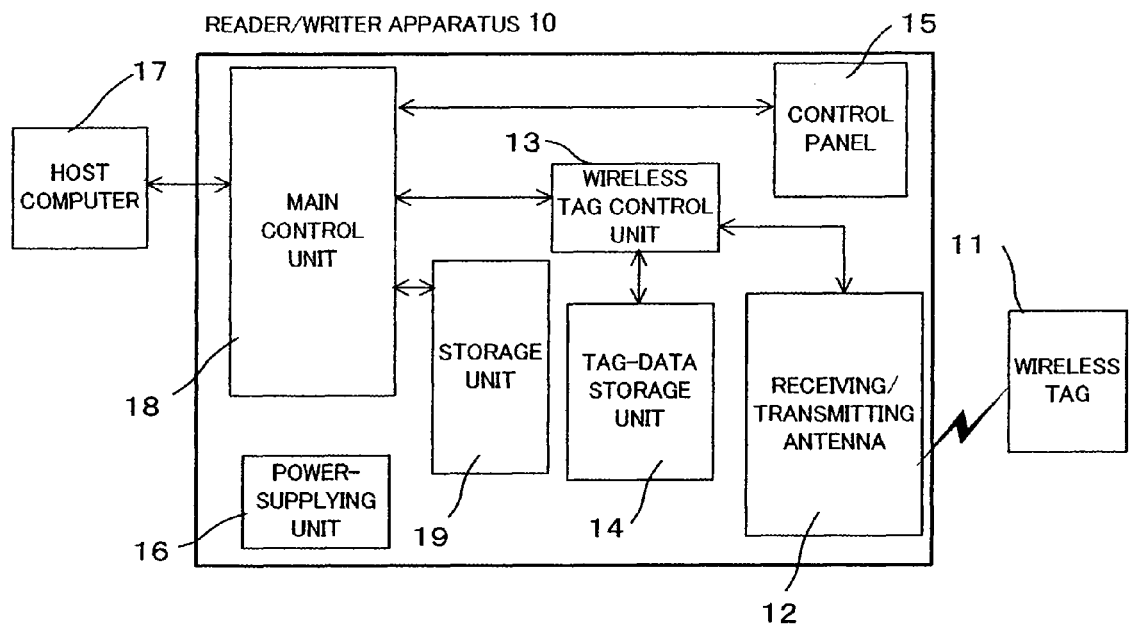
FIG. 1 is a diagram showing the configuration of a reader/writer apparatus according to an embodiment of the present invention.

FIG. 1 is a diagram showing the overall configuration of a wireless tag reader/writer apparatus according to an embodiment of this invention. The wireless tag reader/writer apparatus 10 includes a receiving/transmitting antenna 12, a wireless tag control unit 13, a tag-data storage unit 14, a control panel 15, a power-supplying unit 16, a main control unit 18, and a storage unit 19. The receiving/transmitting antenna 12 receives data from, and transmits data to, a wireless tag 11. The wireless tag control unit 13 can receive data from the receiving/transmitting antenna 12, modulate the data to generate an interrogation signal or a write signal, and transmit the interrogation signal or write signal to the wireless tag 11. Further, the wireless tag control unit 13 can receive a response signal from the receiving/transmitting antenna 12, and can demodulate the response signal, thereby to generate data. The tag-data storage unit 14 is connected to the wireless tag control unit 13 and stores the data read from the wireless tag 11 and the data to be written in the wireless tag 11. The control panel 15 is the console panel of the reader/writer apparatus 10 and has the function of displaying and inputting data. The power-supplying unit 16 supplies power to the other components of the reader/writer apparatus 10. The main control unit 18 controls the above components and is connected, whenever necessary, to a host computer 17 that is provided outside the reader/writer apparatus 10. The storage unit 19 is connected to the main control unit 18. Necessary data can be stored into, and read from, the storage unit 19.

The main control unit 18 of the reader/writer apparatus 10 and the host computer 17 are connected by a USB1.1 cable or a USB2.0 cable. The main control unit 18 and the wireless tag control unit 13 are connected by, for example, a CMOS serial interface.

Figure 2:
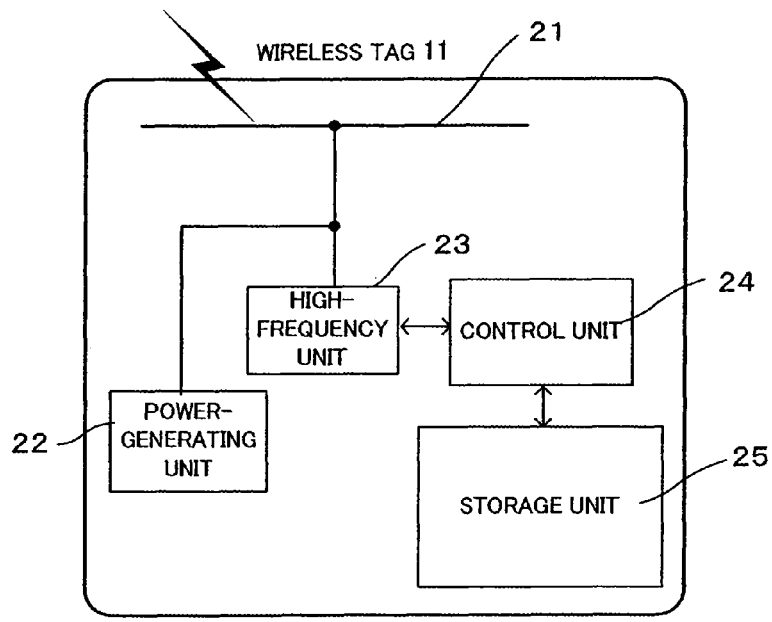
FIG. 2 is a diagram showing a configuration that a wireless tag according to the embodiment of this invention may have.

FIG. 2 shows a configuration that the wireless tag 11 shown in FIG. 1 may have. As FIG. 2 shows, the wireless tag 11 includes a receiving/transmitting antenna 21, a power-generating unit 22, a high-frequency unit 23, a control unit 24, and a storage unit 25. The receiving/transmitting antenna 21 receives the interrogation signal and write signal transmitted from the reader/writer apparatus 10 and transmits the response signal to the reader/writer apparatus 10. The power-generating unit 22 generates power of the wireless tag 11 from the current acquired by rectifying the signal received at the receiving/transmitting antenna 21. The high-frequency unit 23 demodulates the interrogation signal and write signal received at the receiving/transmitting antenna 21, modulates response data and supplies the same to the receiving/transmitting antenna 21. The control unit 24 processes the interrogation data and write data supplied from the high-frequency unit 23, generating response data. The response data thus generated is supplied to the high-frequency unit 23. The storage unit 25 stores the data the control unit 24 has received. The data may be read from the storage unit 25, when necessary.

Figure 3:
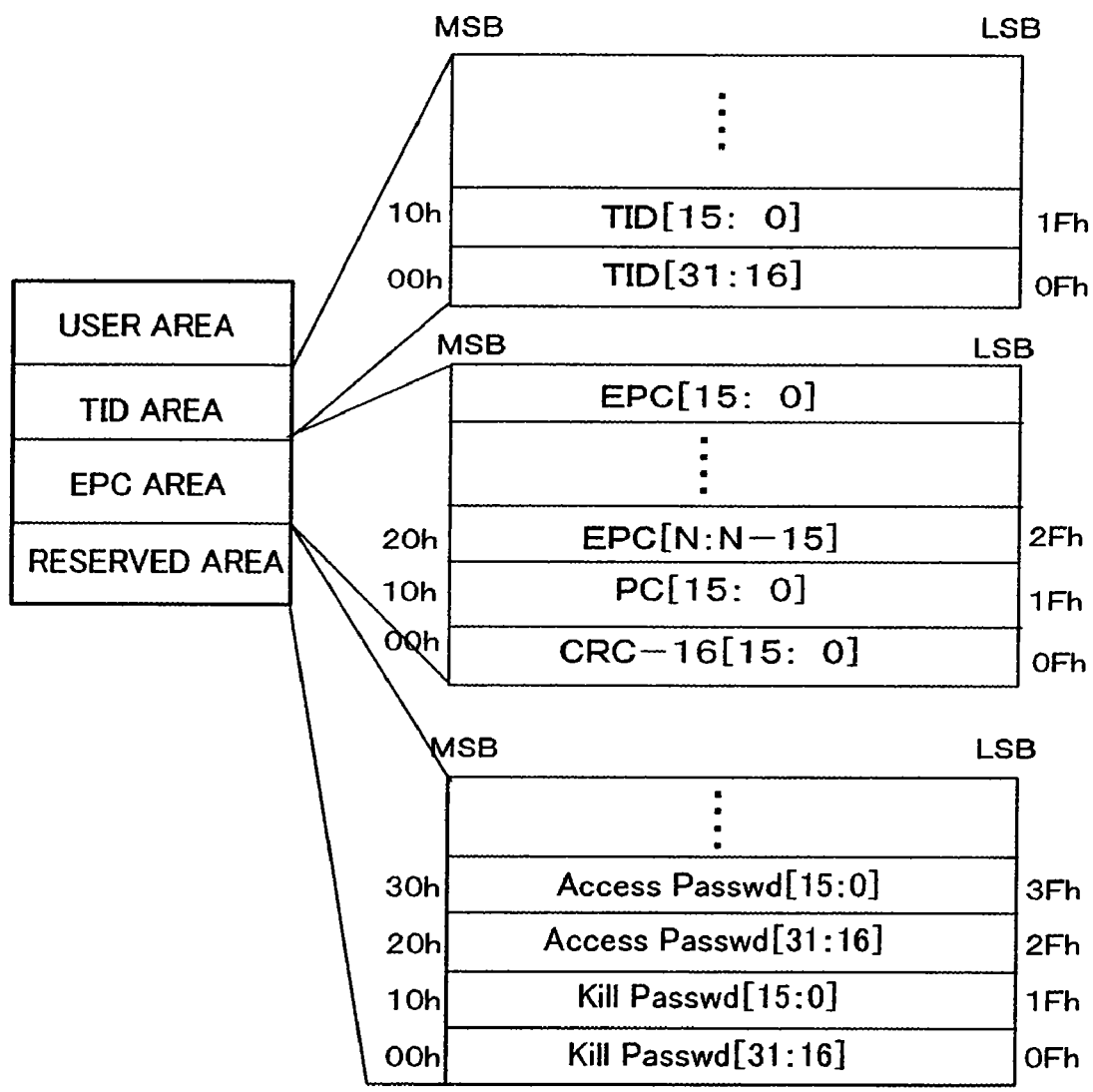
FIG. 3 is a diagram illustrating a configuration that the storage unit 25 of the wireless tag shown in FIG. 2 may have.

Theoretically, the storage unit 25 of the wireless tag 11 is divided into four banks as shown in FIG. 3. The bank 1 is a reserved area, the bank 2 is an EPC area, the bank 3 is a TID area, and the bank 4 is a user area. In the reserved area, or bank 1, a kill password and an access password are contained. More precisely, the kill password is stored at memory addresses 00h to 1Fh, and the access password is stored at memory addresses 20h to 3Fh. Note that "h" means a hexadecimal number.

In the EPC area, CRC-16 is stored at memory addresses 00h to 0Fh, PC (Protocol-Control) bits are stored at memory addresses 10h to 1Fh, and an EPC (Electronic Product Code) is contained at memory addresses 20h to 2Fh. The EPC (i.e., an electronic code recommended by EPC global) indicates to which object the wireless tag is attached.

In this area, the ID unique to the wireless tag is stored and cannot be rewritten. A provisional ID may be assigned to the wireless tag, in addition to the ID unique to the wireless tag, in an embodiment of the present invention.

PC (Protocol Control) is divided into an EPC-length field and an NSI (Numbering System Identifier). The EPC-length field is stored at memory locations 10h to 14h. The NSI is stored at RFU bit memory locations 17h to 1Fh of memory locations 15h to 16h.

CRC-16, PC and EPC are stored in the order mentioned, starting at the most significant bit. The most significant bit of EPC is stored at memory location 20h.

In the TID area, an 8-bit ISO/IEC15963-allocated class identifier is contained at memory locations 00h to 07h. The TID area contains ID data at memory locations higher than 07h. This ID data is ample enough to enable any interrogator to identify uniquely the custom command and/or a given function, which the wireless tag supports. Assume that the ISO/IEC15963 allocated class identifier of the wireless tag is 111000102. Then, the ID data consists of a 12-bit tag-mask designer identifier and a tag-model number. The tag-mask designer identifier is contained at memory locations 08h to 13h. The tag-model number is contained at memory locations 14h to 1Fh. The wireless tag may contain tag-unique data and vender-unique data (e.g., serial number of the tag) in the TID area located higher than memory location 1Fh.

The user area is a storage area dedicated to user data. Its storage configuration can be defined by the user. This area varies in accordance with the storage capacity of the memory. It was very small at the initial stage of technology. In view of this, it is not desirable to use this area, in common to all wireless tags.

In this embodiment of the present invention, the group ID assigned to the wireless tag 11 and two other wireless tags 11 is stored in the EPC area. The two other wireless tags 11 are assigned with numbers related to the wireless tag 11. The group ID is stored in the above-mentioned reserved area.

How this embodiment operates will be explained. In this embodiment, one wireless tag 11 is attached to each envelope. Assume that ten envelopes should be transported to another place. A group ID is stored in the wireless tags 11 attached to the ten envelopes. At this point, in each wireless tag 11, the group ID is stored in the EPC area, and, in addition, the group ID of three wireless tags 11 is stored as related data in the reserved area. After the ten envelopes have been transported to the other place, the group ID of the wireless tags 11 attached to these envelopes is examined. Hereinafter, the mode, in which the group ID is assigned to the wireless tags 11 before the envelopes are transported, shall be called "preparation mode", and the mode in which whether any envelope has dropped out is inspected shall be called "inspection mode".

The data representing the group ID, which should be transmitted to each wireless tag 11 in the preparation mode, is generated in the reader/writer apparatus 10. More specifically, the main control unit 18 generates the data, with assistance of the storage unit 19. The data thus generated is supplied via the wireless tag control unit 13 to the tag-data storage unit 14 and is temporarily stored in the tag-data storage unit 14. To transmit this data from the reader/writer apparatus 10, the data is read from the tag-data storage unit 14 and supplied to the receiving/transmitting antenna 12 via the wireless tag control unit 13. The wireless tag control unit 13 modulates the data. The receiving/transmitting antenna 12 transmits the data modulated. In the wireless tag 11, the receiving/transmitting antenna 21 receives the data, and the high-frequency unit 23 demodulates the data, generating transmission data. The transmission data is stored in the storage unit 25. Under the control of the control unit 24, the group ID is written (stored) in the EPC area or the reserved area, as will be described later.

How the embodiment operates in the preparation mode will be explained with reference to the flowchart of FIG. 4. After the operation has been started, the envelopes to be transported in a batch are laid, one on another, in Step S401. Wireless tags 11 are attached to these envelopes. The envelopes constituting the batch have been counted. Assume that this batch consists of ten (10) envelopes (number N=10).

First, in Step S402, the group ID "i" for the wireless tag 11 attached to the first envelope is set to "1." In Step S403, the group ID, "1", is stored in the EPC area of the wireless tag 11. More precisely, the reader/writer apparatus 10 sends a write signal to the wireless tag 11. In the wireless tag 11, the group ID, i.e., "1", is stored in the EPC area of the storage unit 25 (see FIG. 5A).

In the next step, i.e., Step S404, whether the group ID "i" is 4 or more is determined. In this instance, "i" is 1. Therefore, "i" is not 4 or a greater number, and the decision is negative. Thus, the operation goes to Step S406.

In Step S406, the group ID "i" is incremented by one to "2". Then, the operation goes to Step S407. In Step S407, it is determined whether "i" is equal to or greater than N+1. Since "2" is not equal to or greater than N+1, i.e., 11, the operation returns to Step S403. In Step S403, "2" is stored as group ID in the EPC area of the wireless tag 11 attached to the second envelope (see FIG. 5B).

In Step S404, whether the group ID "i" is 4 or more is determined.

Since 2 is not equal to or greater than 4, the operation goes to Step S406 again. In Step S406, "i" is set to "3". The operation returns to Step 403 again, in which "3" is stored as group ID in the EPC area of the wireless tag 11 attached to the third envelope (see FIG. 5C).

Similarly, Steps S404 and S406 are repeated, setting the group ID "i" to "4". Since 4 is not equal to or greater than N+1, i.e., "11", the operation returns to Step S403. In Step S403, "4" is stored as group ID in the EPC area of the wireless tag 11 attached to the fourth envelope. In Step S404, the group ID "i" is 4, the operation goes to Step S405. In Step S405, the group IDs "1", "2" and "3" are stored in the reserved area (see FIG. 5D).

In the next step, S406, the group ID "i" is set to "5". In Step S407, it is determined whether the group ID "i" is equal to or greater than N+1. Since "5" is not equal to or greater than N+1, i.e., "11", the operation returns to Step S403. In Step S403, "5" is stored as group ID in the EPC area of the wireless tag 11 attached to the fifth envelope. In Steps S404 and S405, "2", "3" and "4" are stored in the reserved area of the wireless tag 11 (see FIG. 5E).

Similarly, the data items about the sixth to ninth envelopes are stored in the EPC areas and reserved areas of the wireless tags attached to these envelopes, respectively. In Step S403, "10" is stored as group ID in the EPC area of the wireless tag 11 attached to the tenth envelope (see FIG. 5G). At this point, the group ID "i" is greater than "4". Therefore, the operation goes from Step S404 to Step S405. In Step S405, "7", "8" and "9" are stored in the reserved area of the wireless tag 11 attached to the tenth envelope.

Next, in Step S406, the group ID, "i", is set to "11". The operation then goes to Step S407. Since "11" is equal to N+1, the operation goes from Step S407 to Step S408. In Step S408, it is determined whether "i" is greater than N+3, i.e., "13". Since "11" is not greater than "13", the operation returns to Step S404. In Step S404, the first envelope of the second batch, or the eleventh envelope, is inspected. Since "11" is greater than "4", the operation goes to Step S405.

Thereafter, the group ID of the wireless tags 11 will change to "1", then to "2", and further to "3". Nonetheless, "i" is regarded as "11", "12" and "13", successively. That is, the group ID of the wireless tag 11 attached to the first envelope is "1". Nonetheless, 8 (=N−2), 9 (=N−1) and 10 (=N), where i corresponds to 11, are stored as group IDs in the reserved area of the wireless tag attached to the eleventh envelope (see FIG. 5H).

Similarly, the operation returns from Step S408 to Step S404. In Step S404, it is determined whether "i" is equal to or greater than "4". If "2" is stored as group ID in the EPC area of the wireless tag 11 attached to the twelfth envelope (see FIG. 5I), 9 (=N−1), 10 (=N) and 1 will be stored in the reserved areas of the wireless tag 11 attached to the twelfth envelope. If "3" is stored as group ID in the EPC area of the wireless tag 11 attached to the thirteen envelope (see FIG. 5J), 10 (=N), 1 and 2 will be stored in the reserved areas of the wireless tag attached to the thirteenth envelope (see FIG. 5J).

If Yes in Step S408, that is, if the group ID "i" exceeds N+3, i.e., 13, group IDs are stored in the EPC areas of the ten wireless tags 11, and in the reserved areas of these wireless tags 11.

In this embodiment, the group IDs are allocated to the wireless tags by using, as related numbers, the other group IDs allocated before. Therefore, a step of adding related numbers needs to indeed be performed in part. However, once the group IDs have been stored in the EPC areas of the wireless tags 11, they need not be read again into the wireless tags in order to store the related numbers in the reserved areas of the respective wireless tags 11. In this respect, the embodiment is advantageous.

In this embodiment, the envelopes of each batch are counted before the embodiment is set to the preparation mode. Nonetheless, if the number to store as related data in the reserved area and if when the group ID is stored in the EPC area of a wireless tag, near the last can be determined, the envelopes constituting each batch need not be counted beforehand.

Figure 8:
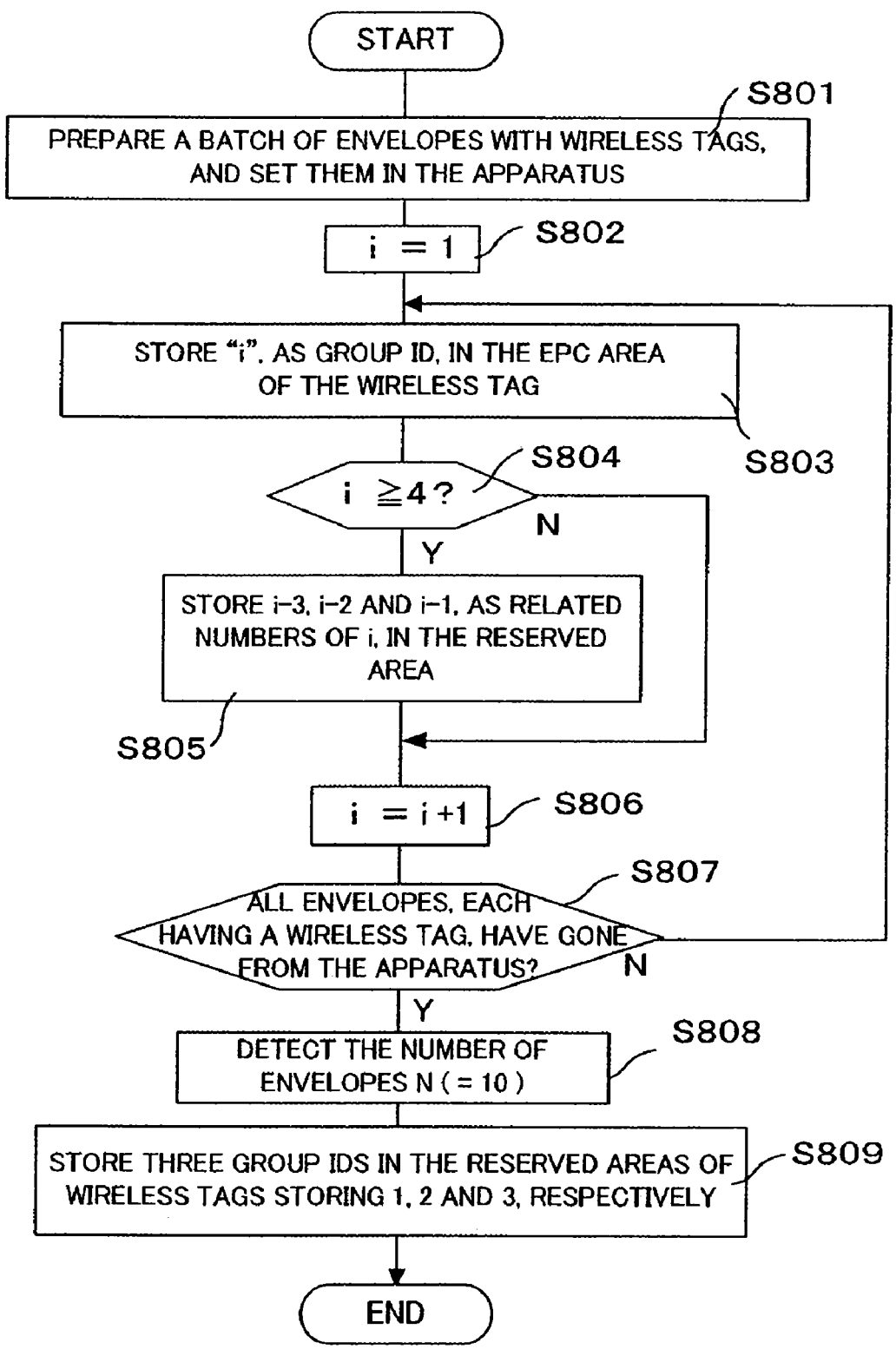
FIG. 8 is a flowchart explaining how to store a related number in the case where the articles forming a batch (number N) are not counted in advance in the first embodiment of the present invention.

FIG. 8 is a flowchart explaining how this embodiment operates. In Step S801, a batch of envelopes is prepared, each envelope having a wireless tag, and is set in the apparatus. Unlike in the case shown in FIG. 4, the number N of envelopes need not be counted.

Figure 4:
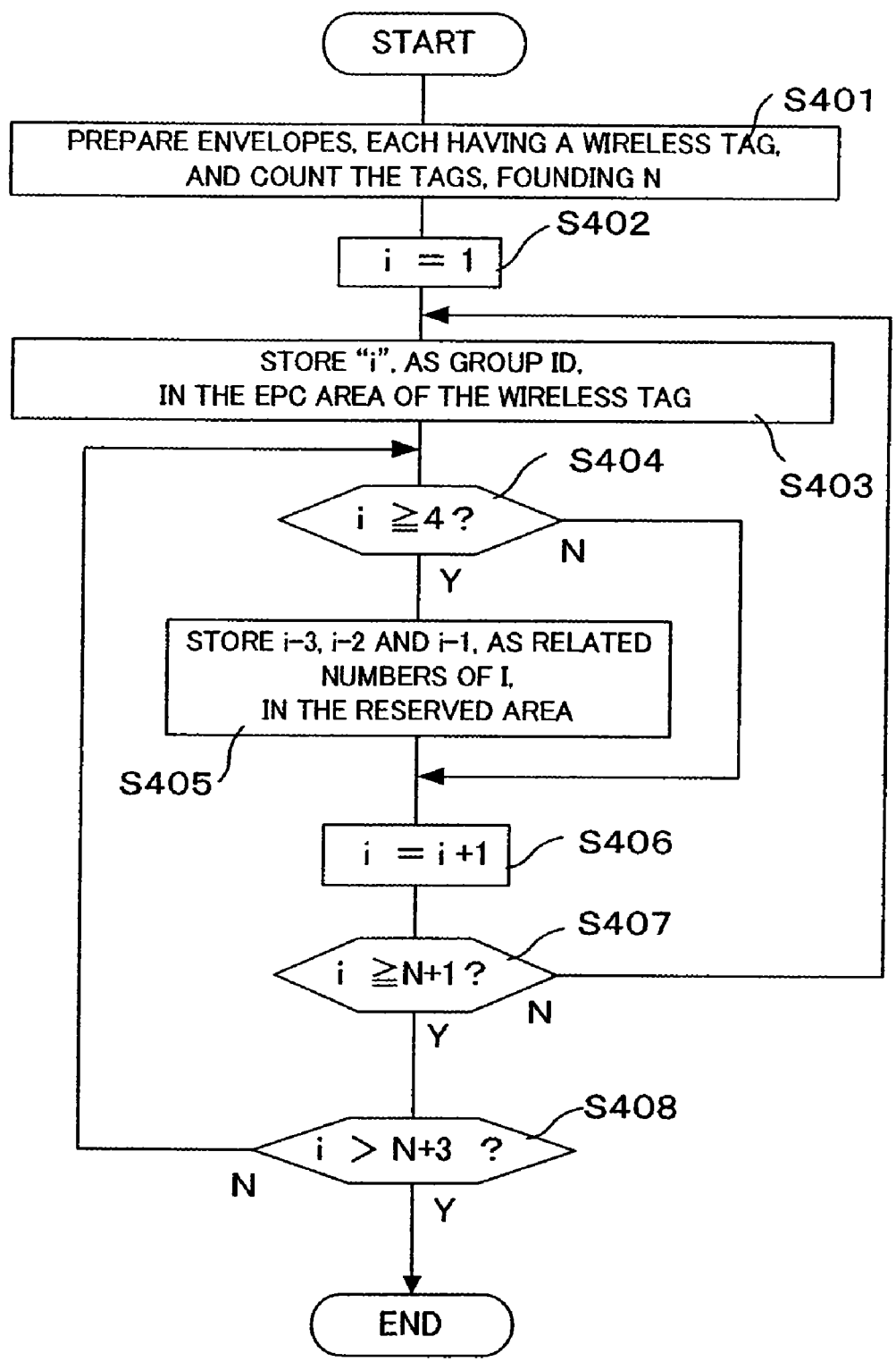
FIG. 4 is a diagram explaining how the reader/writer apparatus according to a first embodiment of the invention writes group ID in a wireless tag.

Steps S802 to S806 are similar to Steps S402 to S406 shown in FIG. 4. In Step S807, it is determined whether the envelopes, each having a wireless tag, have gone from the apparatus. In other words, it is determined whether no envelopes are left in the apparatus. If any envelope is left, the operation returns to Step S803. In Step S803, the group ID is stored in the EPC area of the wireless tag attached to the envelope.

In Step S807, no envelopes, each having a wireless tag 11, may be found in the apparatus. In this case, the operation goes to Step S808, in which the number of the envelopes is detected. Then, in Step S809, (N–2, N–1, N), (N–1, N, 1) and (N, 1, 2) are stored in the reserved areas of three wireless tags 11 that stores 1, 2 and 3 as group IDs in their EPC areas, respectively. Thus, the process of storing group IDs in the EPC areas and the related numbers in the reserved areas is completed.

How this embodiment operates in the inspection mode in order to display whether any envelope has dropped out will be explained with reference to the flowchart of FIG. 6. Assume that ten envelopes, each having a wireless tag 11 storing a group ID, are transported to another place. The envelopes of the batch subjected to the inspection mode need not be counted.

First, in Step S601, the envelopes of a batch are set in the apparatus, so that whether any envelope has dropped out may be determined. Then, the wireless tags 11 may be read in a random order.

In Step S602, the reader/writer apparatus 10 reads the group ID stored in the reserved area of the storage unit 25 of the wireless tag 11 attached to each envelope. More precisely, the wireless tag control unit 13 of the reader/writer apparatus 10 shown in FIG. 1 generates interrogation data, asking for the group ID stored in the reserved area of the wireless tag 11 and modulates the same. The interrogation data is transmitted from the receiving/transmitting antenna 12 to the wireless tag 11.

In the wireless tag 11 shown in FIG. 2, the control unit 24 examines the reserved area of the storage unit 25 and generates response data responding to the interrogation data. The high-frequency unit 23 modulates the response data, generating a response signal. The receiving/transmitting antenna 21 transmits the response signal. The response signal is received by the receiving/transmitting antenna 12 of the reader/writer apparatus 10. In the reader/writer apparatus 10, the wireless tag control unit 13 demodulates the response signal, generating response data. The response data is input to the tag-data storage unit 14.

In the inspection mode, an envelope, which was not included in the batch in the preparation mode, may mingle into the batch. In this case, no group ID is stored in the reserved area of the wireless tag 11 at the time of Step S602. Any envelope having such a wireless tag 11 can therefore be easily detected. Instead, the group ID stored in the EPC areas of the wireless tag may of course be detected.

In the next step, i.e., Step S603, it is determined whether the wireless tags 11 attached to all envelopes have been read. If the wireless tags 11 attached to all envelopes have not been read, the operation returns to Step S602. In Step S602, the group ID is read from the reserved area of the storage unit 25 of the wireless tag 11 attached to each envelope.

In the Step S603, it may be determined that the wireless tags 11 attached to all envelopes have been read. Then, the operation goes to Step S604, in which it is determined whether every group ID has been detected three times. This decision can be made by the wireless tag control unit 13 that examines the group ID stored in the tag-data storage unit 14, or by the main control unit 18 that examine, via the wireless tag control unit 13, the group ID stored in the tag-data storage unit 14.

If every group ID is found to have been detected three times, in Step S604, the operation goes to Step S605. In Step S605, the display unit provided on the control panel 15 of the reader/writer apparatus 10 displays a message showing that no envelopes have dropped out.

Any group ID may be found to have been only once or twice. If this is the case, the operation goes from Step S604 to Step S606. In Step S606, the display unit provided on the control panel 15 displays a message showing this fact.

Thus, it can be determined whether any envelope has dropped out from the batch.

Note that the main control unit 18 may perform the function of a group-ID detecting unit that receives the response data contained in a response signal and detects the group ID stored in the reserved area and EPC area of a wireless tag. The main control unit 18 may further perform the function of an ID-number detecting unit that detects the number of the group IDs stored in the reserved area and the contents of the group IDs. Still further, the main control unit 18 may perform the function of a dropped-out wireless tag identifying unit that identifies the wireless tag that has dropped out.

Figure 7:
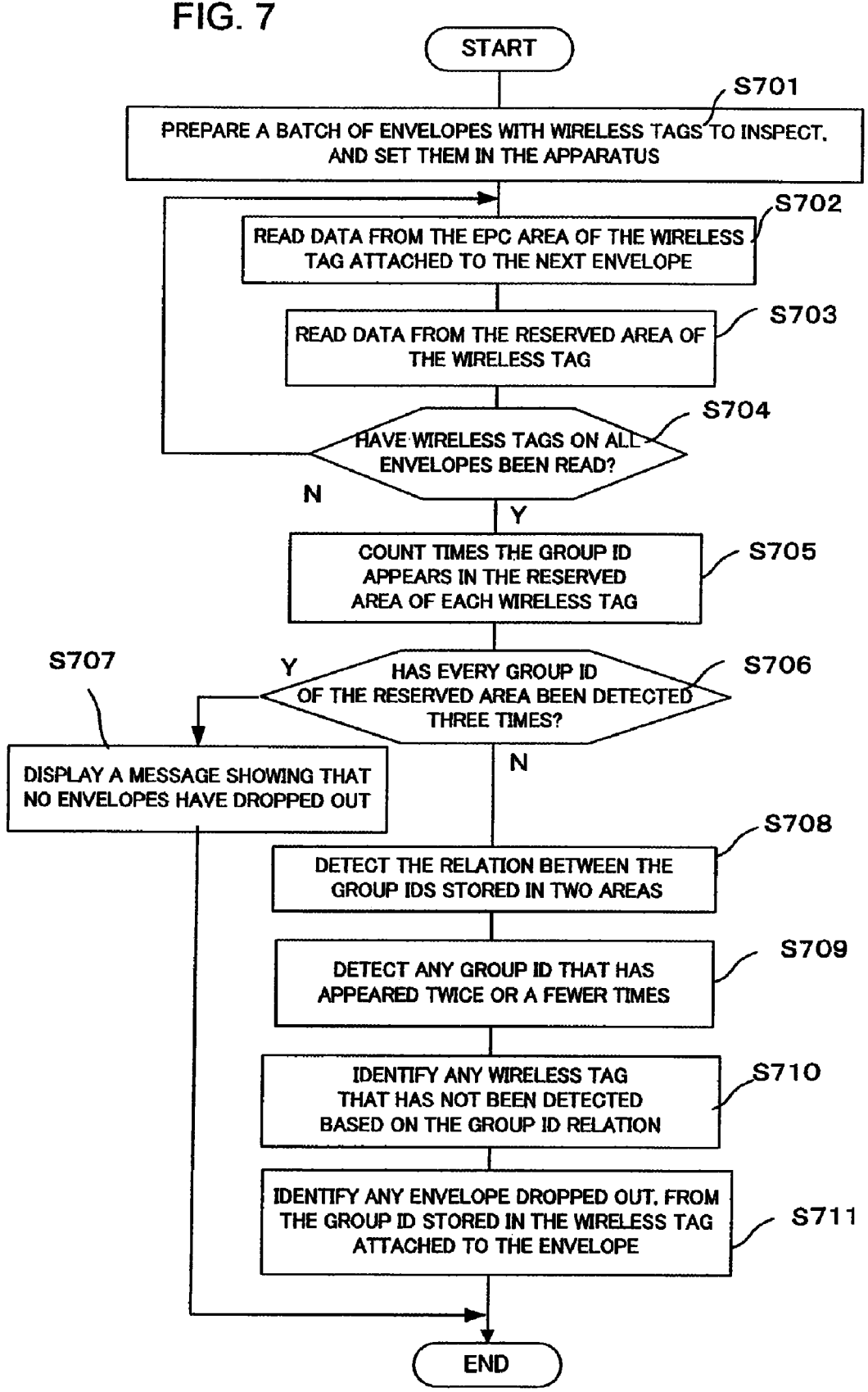
FIG. 7 is a flowchart explaining a method that the reader/writer apparatus shown in FIG. 1 performs to detect any wireless tag that has dropped out in the first embodiment of the present invention.

How to specify any envelope that has dropped out in the inspection mode will be explained with reference to the flowchart of FIG. 7. Assume ten envelopes forming a batch, each allocated with a group ID as described above, are transported to another place. Then, when the group ID is written in the EPC area of the wireless tag attached to each envelope, the relation between the envelope and the group ID thus stored should be written, too.

Figure 6:
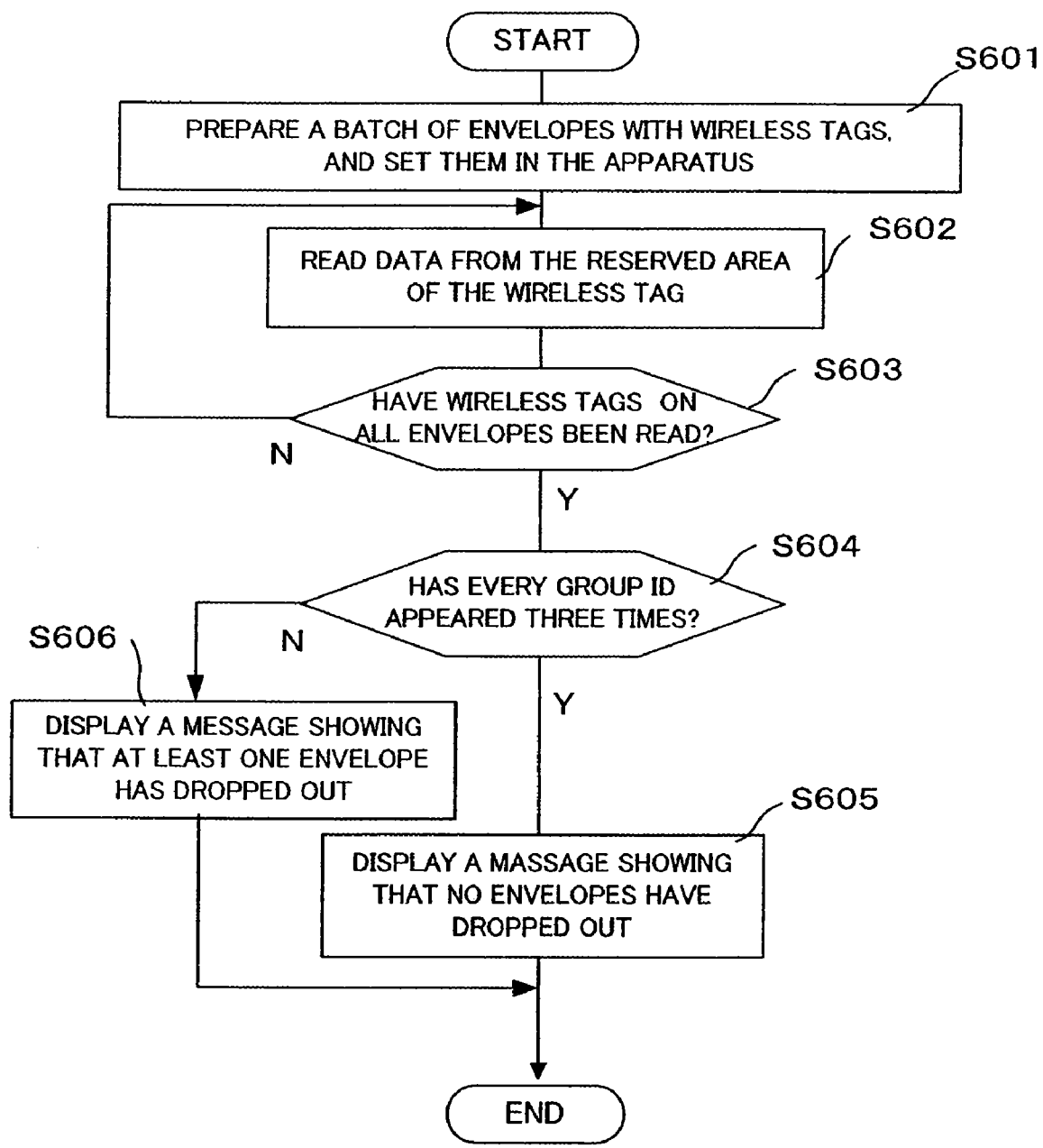
FIG. 6 is a flowchart explaining a method that the reader/writer apparatus according to the first embodiment of the invention performs to detect any wireless tag that has dropped out.

As in Step S601 shown in the flowchart of FIG. 6, the envelopes of a batch are prepared and set in the apparatus in Step S701. In this case, too, the wireless tags 11 may be read in a random order.

In Step S702, the EPC area of the wireless tag 11 attached to each envelope is read. As in the case described with reference to FIG. 6, the reader/writer apparatus 10 asks for the group ID stored in the storage unit 25 of the wireless tag 11. That wireless tag 11 transmits a response signal. From the response signal, the group ID is acquired.

Note that the group ID written in the EPC area of the storage unit 25 of the wireless tag 11 is read in Step S702, and the group ID stored in the reserved area of the storage unit 25 of the wireless tag 11 is read in Step S703. The group IDs stored in the EPC and reserved areas, respectively, may of course be read in one step in response to one interrogation signal, not in Steps S702 and S703. This method would be more efficient.

In the next step, Step S704, it is determined whether the wireless tags 11 attached to all envelopes have been read. If the wireless tags 11 attached to all envelopes have not been read, Steps S702 and S703 are repeated. That is, the apparatus 10 keeps reading the group IDs from the EPC and reserved areas of the wireless tags 11.

When the apparatus 10 finishes reading the wireless tags 11 attached to all envelopes, the operation goes to Step S705. In Step S705, the number of times the group ID appears in the reserved area of each wireless tag 11 is calculated. In Step S706, whether every group ID has been detected three times is determined.

Figure 5:
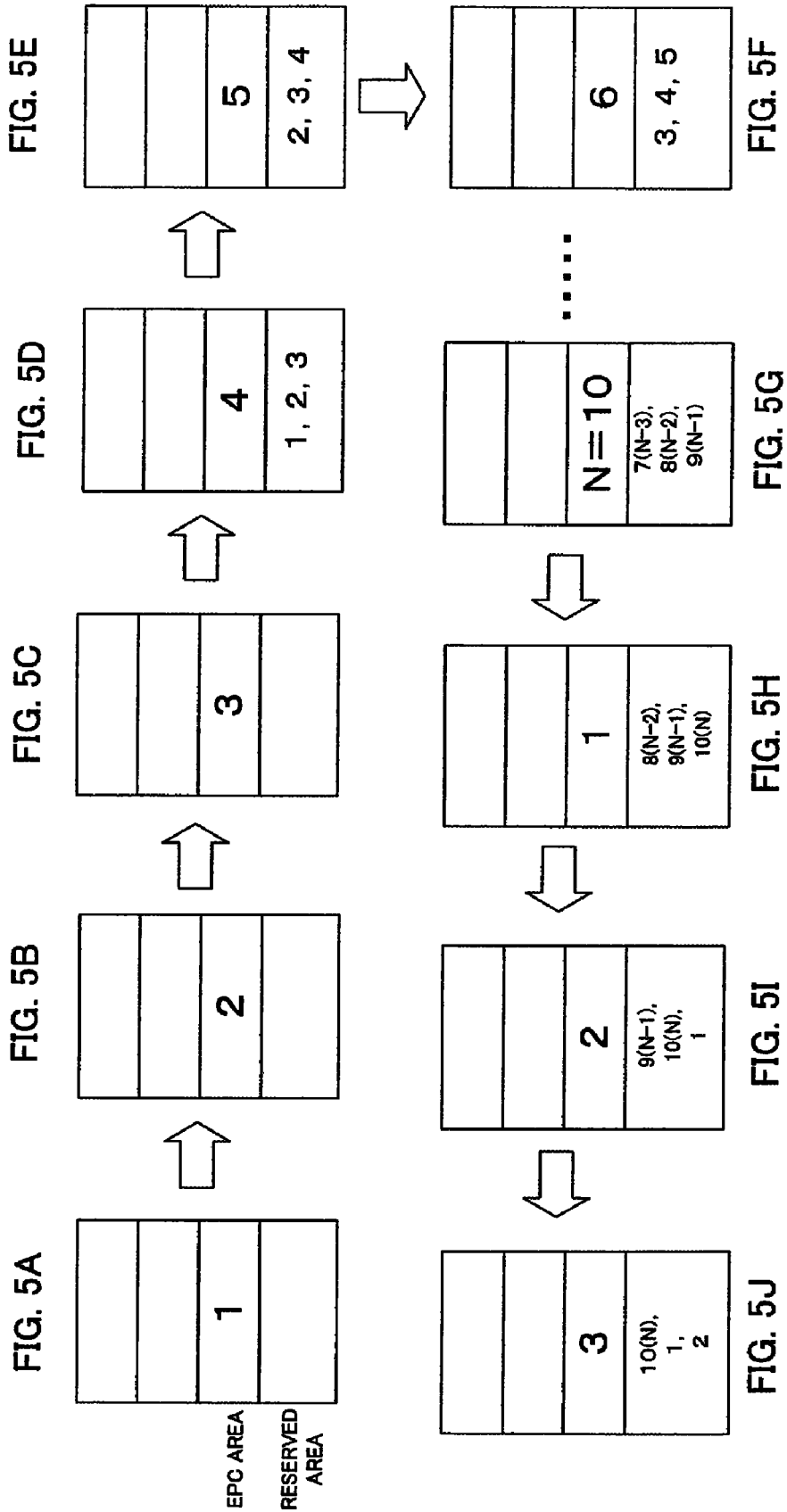
FIGS. 5A to 5J are diagrams explaining the order in which group ID is stored in a storage unit provided in the wireless tag according to the first embodiment of the invention.

This is because each group ID is stored in the reserved areas of the three immediately preceding wireless tags 11. For example, in the wireless tag 11 whose EPC area holds "3", the group ID appears in the reserved area three times, first as shown in FIG. 5D, then as shown in FIG. 5E, and finally as shown in FIG. 5F. If the wireless tag 11 shown in FIG. 5E is not read at all, the group IDs "2", "3" and "4" will appear only twice. In this case, it can be determined, from the relation between the group IDs, that the wireless tag 11 whose EPC area holds "5", i.e., the group ID next to these group IDs, has not been read yet.

Two consecutive wireless tags 11, for example, the wireless tag 11 whose EPC area holds "5" as shown in FIG. 5E and the wireless tag 11 whose EPC area holds "6" as shown in FIG. 5F, may not be read yet. In this case, the group IDs "3" and "4" appear only once in the reserved areas, and the group IDs "2" and "5" appear only twice in the reserved areas.

Three consecutive wireless tags 11, for example, the wireless tag 11 whose EPC area holds "5" as shown in FIG. 5E, the wireless tag 11 whose EPC area holds "6" as shown in FIG. 5F, and the wireless tag 11 whose EPC area holds "7" may not be read yet. If this is the case, the group ID "4" does not appear in the reserved areas at all, the group IDs "5" and "3" appear only once in the reserved areas, the group IDs "2" and "6" appear only twice in the reserved areas. Further, four consecutive wireless tags 11, for example, the wireless tag 11 whose EPC area holds "5" as shown in FIG. 5E, the wireless tag 11 whose EPC area holds "6" as shown in FIG. 5F, the wireless tag 11 whose EPC area holds "7", and the wireless tag 11 whose EPC area holds "8" may not be read yet. In this case, neither the group ID "4" nor the group ID "5" appears at all.

Thus, any wireless tag 11 that cannot be read can be identified based on the number of the group IDs stored in the reserved area, and the relation between the group ID stored in the EPC area and the group ID stored in the reserved area.

In Step S706, all group IDs stored in the reserved area may be found to have appeared three times. Then, the operation goes to Step S707. The display unit of the provided on the control panel 15 displays a message showing that no envelopes have dropped out.

If any group ID has appeared twice or only once, the operation goes to Step S708. In Step S708, the wireless tag control unit 13 detects the relation between the group ID stored in the EPC area and the group ID stored in the reserved area.

In the cases shown in FIGS. 5A to 5J, there are three group IDs that are stored in the reserved area. As can be understood from FIGS. 5A to 5J, they are three group IDs that immediately precede the group ID stored in the EPC area.

In Step S709, any group ID that is stored in the reserved area and appears twice or a fewer times is detected. From the group ID thus detected, the group ID that should be stored in the EPC area of the wireless tag 11 that could not be read is determined, using the group ID relation detected in Step S708.

Assume that "8" has appeared twice and that "9" has appeared only once. Then, the group IDs stored in the EPC area are "1" and "2". Hence, the wireless tag 11 shown in FIG. 5I and the wireless tag 11 shown in FIG. 5H are found to have dropped out.

Thus, any wireless tag 11 that has not been detected is identified in Step S710, and the envelope to which the wireless tag 11 not detected is attached, i.e., envelope dropped out, is identified in Step S711.

In the embodiment described above, the wireless tag 11 is one attached to an envelope. Nonetheless, it may be one attached to any other kind of an article. Further, the apparatus 10 need not be operated in the inspection mode immediately after operating in the preparation mode. That is, it may first assigns numbers to the articles of a batch, one after another, and may later operate in inspection mode, on the articles of each group, which are assigned with the same number.

In the embodiment described above, the group ID of three consecutive wireless tags 11, each storing the group ID in the EPC area, is stored in the reserved area of the wireless tag 11 that immediately follows. This is desirable because the group ID can be efficiently stored in the reserved area.

Nevertheless, the group ID may be stored in the reserved area after it has been stored in the EPC area of each wireless tag 11. Then, the group ID may remain stored in the reserved area, or the two group IDs preceding and following this group ID may instead be stored in the reserved area. Moreover, not consecutive group IDs (i.e., serial numbers), but regularly intermittent group IDs may be stored in the wireless tags 11.

If numbers are used as group IDs as in the embodiment described above, the user can intuitively and easily understand the order in which the wireless tags 11 are arranged and the number of wireless tags forming the batch.

In the embodiment described above, three group IDs are stored in the reserved area. Nonetheless, four or more group IDs may be stored in the reserved area. The larger the number of group IDs stored in the reserved area, the more unreadable wireless tags will be identified.

The relation between the group ID stored in the EPC area and the group ID stored in the reserved area may be determined in the inspection mode, and the number of times the group ID stored in the reserved area has appeared may be determined, too, as in the embodiment described above. The wireless tag 11, that is, any envelope that has dropped out can therefore be identified.

A provisional ID, such as a provisional number or a provisional code, may be assigned to the wireless tags 11 attached to the articles of each batch, in addition to the IDs unique to the wireless tags 11, as in the embodiment described above. Then, the group ID of these wireless tags 11 can be unique to the group and can therefore consist of a few digits. The number, which is stored as related number in the reserved area, can consist of a few digits, too. This saves the storage area in each wireless tag.

In the first embodiment, numbers have been allocated as group IDs. The group IDs need not be numbers, nevertheless. They may be alphabetical codes, instead. Moreover, they need not be allocated in an orderly fashion.

Second Embodiment

In the first embodiment described above, a provisional ID is assigned, as group ID, to the wireless tags 11 attached to the envelops of each batch. Further, the first embodiment is based on the assumption that the wireless tags 11 attached to these envelopes are sequentially read in order to store the group ID in the EPC area.

In the present invention, the group ID can be an un-rewritable ID that is stored in the EPC area of each wireless tag. Moreover, in the present invention, the reader/writer apparatus may transmit an interrogation signal to the wireless tags 11 attached to the envelopes of a batch and may read the responses from these wireless tags 11. (Thus, the reader/writer apparatus can identify the group ID stored in the wireless tags 11, one after another.)

The second embodiment will be described. The reader/writer apparatus 10 and the wireless tags 11, all used in the second embodiment, are identical to those shown in FIGS. 1 and 2.

Figure 9:
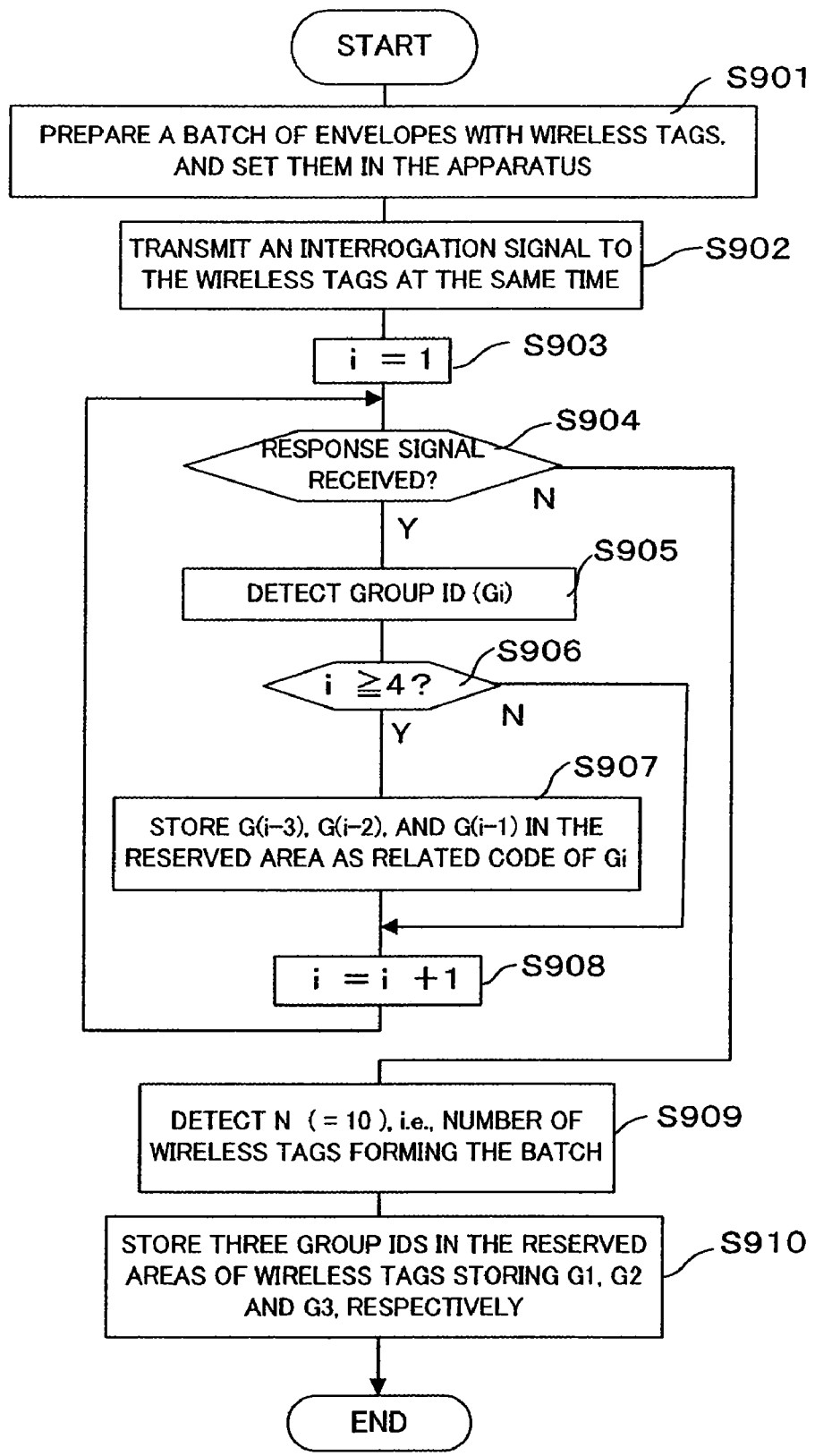
FIG. 9 is a flowchart explaining how group IDs are stored in the reserved area of the storage unit of a wireless tag according to a second embodiment of the present invention.

FIG. 9 is a flowchart explaining how the reader/writer apparatus 10 operates in the preparation mode. In Step S901, a batch N of envelopes, each having a wireless tag 11 attached to it, is prepared. These envelopes are set in the reader/writer apparatus 10. The reader/writer apparatus 10 transmits an interrogation signal to the wireless tags 11, requesting for the ID (here, called "group ID") that is unique to each wireless tag 11 and is stored in the EPC area of the wireless tag 11 (Step S902).

In Step S903, "i" is set to 1. Note that, in this embodiment, "i" indicates the order in which the reader/writer apparatus 10 has received response signals from the wireless tags 11. In Step S904, it is determined whether the reader/writer apparatus 10 has received response signals the wireless tags 11 transmit in response to the interrogation signals transmitted at a time to the wireless tags 11.

In Step S904, the reader/writer apparatus 10 may be found to have received the response signal transmitted from any wireless tag 11. In this case, the group ID contained in the response signal is detected. The group ID is unique to the wireless tag 11 and shall be referred to as "Gi," hereinafter.

Since "i" means the order in which the wireless tags 11 are detected by the reader/writer apparatus, the group ID of the wireless tag 11 from which the reader/writer apparatus 10 has received the first response signal is G1 (in Step S905). Similarly, the group ID of the wireless tag 11 from which the reader/writer apparatus 10 has received the second and third response signals are G2 and G3. These group IDs are IDs, each unique to one wireless tag. Therefore, they are never consecutive numbers or consecutive codes.

In Step S906, it is determined whether "i" is 4 or a greater number. If "i" is equal to or smaller than 3, the operation goes to Step S908. In Step S908, "i" is changed to i+1. Then, the operation returns to Step S904, in which the reader/writer apparatus waits for the next response signal.

When the next response signal is received, the group ID is detected from the response signal in Step S905. The second group ID received and detected is G2. This group ID is also a code unique to the wireless tag 11.

Similarly, whether "i" is 4 or a greater number is determined in Step S906. In other words, it is detected whether the response signal that the wireless tag 11 transmits in response to the interrogation signal transmitted from the reader/writer apparatus 10 is the fourth signal or any signal following the fourth. If "i" is 4 or a greater number, the operation goes to Step S907. In Step S907, G(i−3), G(i−2) and G(i−1) are stored in the reserved area of the wireless tag 11 (of which group ID is Gi). That is, the reader/writer apparatus 10 transmits a write signal to the wireless tag 11 in which Gi is stored as group ID in the EPC area. Then, the three group IDs specified above are stored in the reserved area of the wireless tag 11.

In the next step, i.e., Step S908, "i" is changed to "i+1". Then, the operation returns to Step S904, in which the reader/write apparatus waits for the next response signal. If no response signals come from the wireless tag 11, the operation goes to Step S909. In Step S909, the number N of the response signals thus far received is detected. If the apparatus 10 has received ten response signals, N will be 10 (N=10).

The operation then goes to Step S910. In Step S910, the group IDs of the three wireless tags 11 preceding the wireless tag whose group ID is stored in the EPC area are stored in each of three wireless tags whose group IDs are G1, G2 and G3, respectively. More specifically, GN−2, GN−1 and GN are stored in the reserved area of the wireless tag 11 whose group ID is G1; GN−1, GN and G1 are stored in the reserved area of the wireless tag 11 whose group ID is G2; and GN, GN1 and G2 are stored in the reserved area of the wireless tag 11 whose group ID is G3.

Thus, related data items are stored in the reserved areas of the wireless tags 11 of one batch in the preparation mode.

How the reader/writer apparatus 10 operates in the inspection mode will be explained below. In this operating mode, the reader/writer apparatus 10 transmits an interrogation signal, at the same time, to the wireless tags 11 attached to all envelops forming a batch. The apparatus 10 then waits for response signals coming from the respective wireless tags 11. The apparatus 10 can process response signals coming from the wireless tags 11, one after another.

Figure 10:
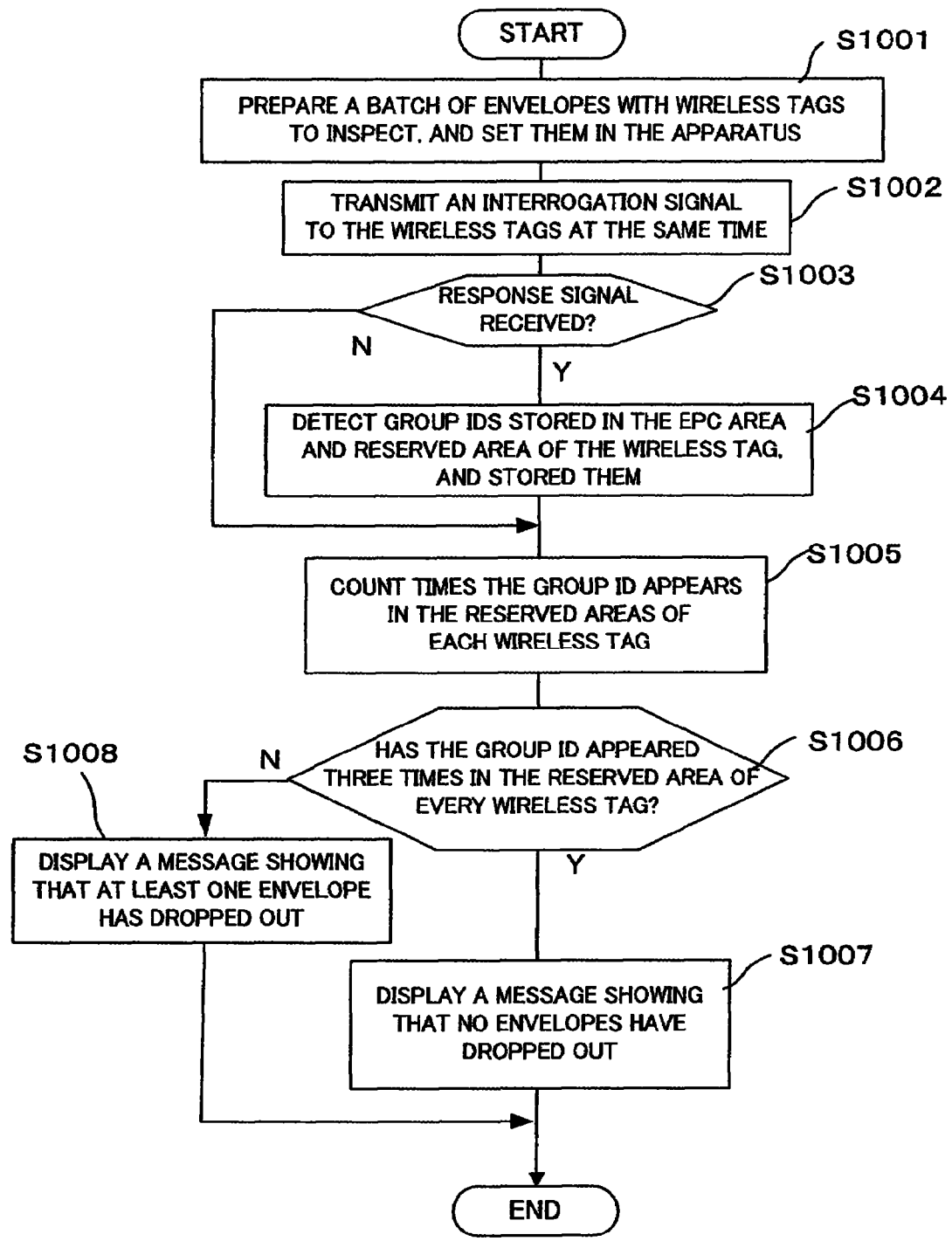
FIG. 10 is a flowchart explaining a method that the reader/writer apparatus shown in FIG. 1 performs to detect any wireless tag that has dropped out according to the second embodiment.

As shown in the flowchart of FIG. 10, envelopes of one batch, each having a wireless tag 11 attached to it, are prepared and set in the reader/writer apparatus 10 in Step S1001. In Step S1002, the reader/writer apparatus 10 transmits an interrogation signal to all of these wireless tags 11 at a time, requesting for the group IDs stored in the EPC areas of the respective wireless tags 11 and for the three group IDs stored as related data in the reserved areas of the wireless tags 11.

In Step S1003, the reader/writer apparatus 10 determines whether a response signal has been received. That is, the apparatus 10 waits for a response signal coming from any wireless tag 11. On receiving a response signal coming from the wireless tag, the reader/writer apparatus 10 detects the group ID stored in the EPC area and reserved area and contained in the response signal, and stores this group ID in Step S1004.

In the next step, i.e., Step S1005, the number of times the group ID appears in the reserved areas of each wireless tags 11 are counted. In Step S1006, it is determined whether the group ID has appeared three times in the reserved area of every wireless tag 11.

If the group ID is found to have appeared three times in the reserved area of every wireless tag 11, in Step S1007, the display unit of the reader/writer apparatus 10 displays a message showing that no envelopes have dropped out.

In Step S1006, the group ID may be found to have appeared two times or a fewer times in the reserved area of any wireless tag 11. If this is the case, the operation goes to Step S1008, in which the display unit of the reader/writer apparatus 10 displays a message showing that at least one envelope has dropped out.

In the second embodiment, the ID unique to each wireless tag 11 is used as group ID. Therefore, provisional IDs unique to the wireless tags need not be stored in the EPC areas of the respective wireless tags. In this respect, the second embodiment is advantageous.

In the second embodiment, the reader/writer apparatus transmits interrogation signals, at a time, to the wireless tags attached to the envelopes constituting a batch, and receives response signals coming from the wireless tags. Hence, in the inspection mode, group IDs can be written in the reserved areas of all wireless tags, and it can be fast determined whether any envelope has dropped out.

In the embodiments described above, the wireless tags store the group IDs that identify them, respectively in their EPC areas and their reserved areas. Nonetheless, the present invention is not limited to this configuration. In the present invention, of the group IDs stored in the second storage areas of the respective wireless tags, some exhibiting specific regularity can be stored in the first storage areas of the wireless tags.

The present invention are not limited to the embodiments described above. Various changes and modifications can be made within the technical scope and spirit of the invention, thereby providing various embodiments. Such embodiments fall within the scope of the invention, so long as they lie in the technical scope of the present invention.

What is claimed is:

1. A wireless tag reader/writer apparatus comprising:
   a receiving/transmitting antenna configured to transmit an interrogation signal to wireless tags, each having a storage unit with at least a reserved area and an EPC area for storing a group ID unique to the wireless tag, and configured to receive response signals from the wireless tags;
   a tag-data storing unit configured to store interrogation data and response data, the interrogation data being contained in the interrogation signal to be transmitted to the wireless tags, and the response data being contained in the response signals transmitted from the wireless tags; and
   a main control unit configured to detect the group ID stored in the reserved area of each wireless tag, from the response data stored in the tag-data storing unit, and configured to determine that at least one of the wireless tags has dropped out, from the number of group IDs stored in the reserved area of each wireless tag.

2. A wireless tag reader/writer apparatus which transmits an interrogation signal to wireless tags, each having a storage unit with at least a reserved area and an EPC area for storing a group ID unique to the wireless tag, and configured to receive response signals from the wireless tags,
   wherein each of the wireless tags forming a batch stores, in the reserved area, the group IDs of the other wireless tags of the batch, the group ID stored in the reserve area of each wireless tag is detected, and that at least one of the wireless tags has dropped out is determined from the number of group IDs stored in the reserved area of each wireless tag.

3. The wireless tag reader/writer apparatus according to claim 2, wherein the group ID unique to the wireless tag and stored in the EPC area is a provisional ID assigned to the wireless tags forming a batch.

4. The wireless tag reader/writer apparatus according to claim 2, wherein the group ID unique to the wireless tag and stored in the EPC area is an ID that is inherent to each of the wireless tags forming the batch.

5. A wireless tag reader/writer apparatus which transmits an interrogation signal to wireless tags, each having a storage unit with at least a reserved area and an EPC area for storing a group ID unique to the wireless tag, and receives response signals from the wireless tags, the apparatus comprising:
   a reserved-area group ID detecting unit configured to transmit an interrogation signal to the wireless tags forming a batch, each of which stores the group IDs of the other wireless tags of the batch, as related data in the reserved area, to receive response signals from these wireless tags, and to detect thereafter the group IDs stored in the reserved area of each wireless tag;
   a group-ID number detecting unit configured to count the group IDs stored in the reserved area and detected by the reserved-area group ID detecting unit, in connection with the wireless tags of the batch; and
   a dropped-out wireless tag detecting unit configured to detect that at least one of the wireless tags has dropped out, when the number of group IDs the group-ID number detecting unit has counted is smaller than a prescribed number.

6. The wireless tag reader/writer apparatus according to claim 5, wherein the group ID unique to the wireless tag and stored in the EPC area is a provisional ID assigned to the wireless tags forming a batch.

7. The wireless tag reader/writer apparatus according to claim 5, wherein the group ID unique to the wireless tag and stored in the EPC area is an ID that is inherent to each of the wireless tags forming the batch.

8. A wireless tag reader/writer apparatus which transmits an interrogation signal to wireless tags, each having a storage unit with at least a reserved area and an EPC area for storing a group ID unique to the wireless tag, and configured to receive response signals from the wireless tags, the apparatus comprising:
   a group ID detecting unit configured to transmit an interrogation signal to the wireless tags forming a batch, each of which stores the group IDs of the other wireless tags of the batch, as related data in the reserved area, to receive response signals from these wireless tags, and to detect thereafter the group IDs stored in the reserved area of each wireless tag and the group IDs stored in the EPC areas of the wireless tags;
   a relation-detecting unit configured to detect a relation between the group IDs stored in the EPC areas and detected by the group ID detecting unit and the group IDs stored in the reserved area;
   a group-ID number detecting unit configured to count the group IDs stored in the reserved area and detected by the group ID detecting unit, in connection with the wireless tags of the batch; and
   a dropped-out wireless tag identifying unit configured to identify that the some of the wireless tags have dropped out, when the number of group IDs the group-ID number detecting unit has detected is smaller than a prescribed number, on the basis of the relation detected by the relation-detecting unit and a difference between the counted number and the predetermined number.

9. The wireless tag reader/writer apparatus according to claim 8, wherein the group ID unique to the wireless tag and stored in the EPC area is a provisional ID assigned to the wireless tags forming a batch.

10. The wireless tag reader/writer apparatus according to claim 8, wherein the group ID unique to the wireless tag and stored in the EPC area is an ID that is inherent to each of the wireless tags forming the batch.

11. A method of detecting dropping-out of wireless tags, each having a storage unit with at least a reserved area and an EPC area for storing a group ID unique to the wireless tag, the method comprising:
    transmitting an interrogation signal from a wireless tag reader/writer apparatus to wireless tags forming a batch, each of which stores the group IDs of the other wireless tags of the batch, as related data in the reserved area, receiving response signals from these wireless tags, and detecting thereafter the group IDs stored in the reserved area of each wireless tag;

counting the group IDs stored in the reserved, in connection with the wireless tags of the batch; and detecting that at least one of the wireless tags has dropped out, when the number of group IDs counted is smaller than a prescribed number.

12. The method of detecting dropping-out of wireless tags, according to claim 11, wherein the group ID unique to the wireless tag and stored in the EPC area is a provisional ID assigned to the wireless tags forming a batch.

13. The method of detecting dropping-out of wireless tags, according to claim 11, wherein the group ID unique to the wireless tag and stored in the EPC area is an ID that is inherent to each of the wireless tags forming the batch.

14. A method of detecting dropping-out of wireless tags, each having a storage unit with at least a reserved area and an EPC area for storing a group ID unique to the wireless tag, the method comprising:

transmitting an interrogation signal to the wireless tags forming a batch, each of which stores the group IDs of the other wireless tags of the batch, as related data in the reserved area, receiving response signals from these wireless tags, and detecting thereafter the group IDs stored in the reserved area of each wireless tag and the group IDs stored in the EPC areas of the wireless tags;

detecting a relation between the group IDs stored in the EPC areas and detected and the group IDs stored in the reserved area;

counting the group IDs stored in the reserved area, in connection with the wireless tags of the batch; and identifying at least one of the wireless tags has dropped out, when the number of group IDs counted is smaller than a prescribed number, based on the relation between the group IDs and a difference between the counted number and the predetermined number.

15. The method of detecting dropping-out of wireless tags, according to claim 14, wherein the group ID unique to the wireless tag and stored in the EPC area is a provisional ID assigned to the wireless tags forming a batch.

16. The method of detecting dropping-out of wireless tags, according to claim 14, wherein the group ID unique to the wireless tag and stored in the EPC area is an ID that is inherent to each of the wireless tags forming the batch.

17. A wireless tag comprising:

a storage unit having at least a reserved area and an EPC area for storing a group ID unique to the wireless tag, wherein a plurality of group IDs, which are stored in EPC areas of storage units of other wireless tags, that exhibit regularity are stored in the reserved area, the regularity being a regularity between the group ID of the wireless tag and the plurality of group IDs of the other wireless tags.

18. The wireless tag according to clam 17, wherein the group IDs stored in the reserved area are consecutive group IDs previously stored in the EPC areas of a plurality of wireless tags, respectively.

19. A wireless tag having at least a first storage area in which data can be rewritten, a second storage area in which unique group IDs can be stored and rewritten and a third storage area in which a unique group ID can be stored but cannot be rewritten, wherein the group IDs are stored, independently of one another, in the second storage area, and the group IDs stored in the second storage area are stored also in the first storage area, when they exhibit regularity, the regularity being a regularity between the group ID of the wireless tag and the group IDs of other wireless tags.

20. The wireless tag according to claim 19, wherein the group IDs stored in the first storage area are those of the group IDs previously stored in the second storage area, which pertain to consecutive wireless tags.

\* \* \* \* \*